Figure 1:
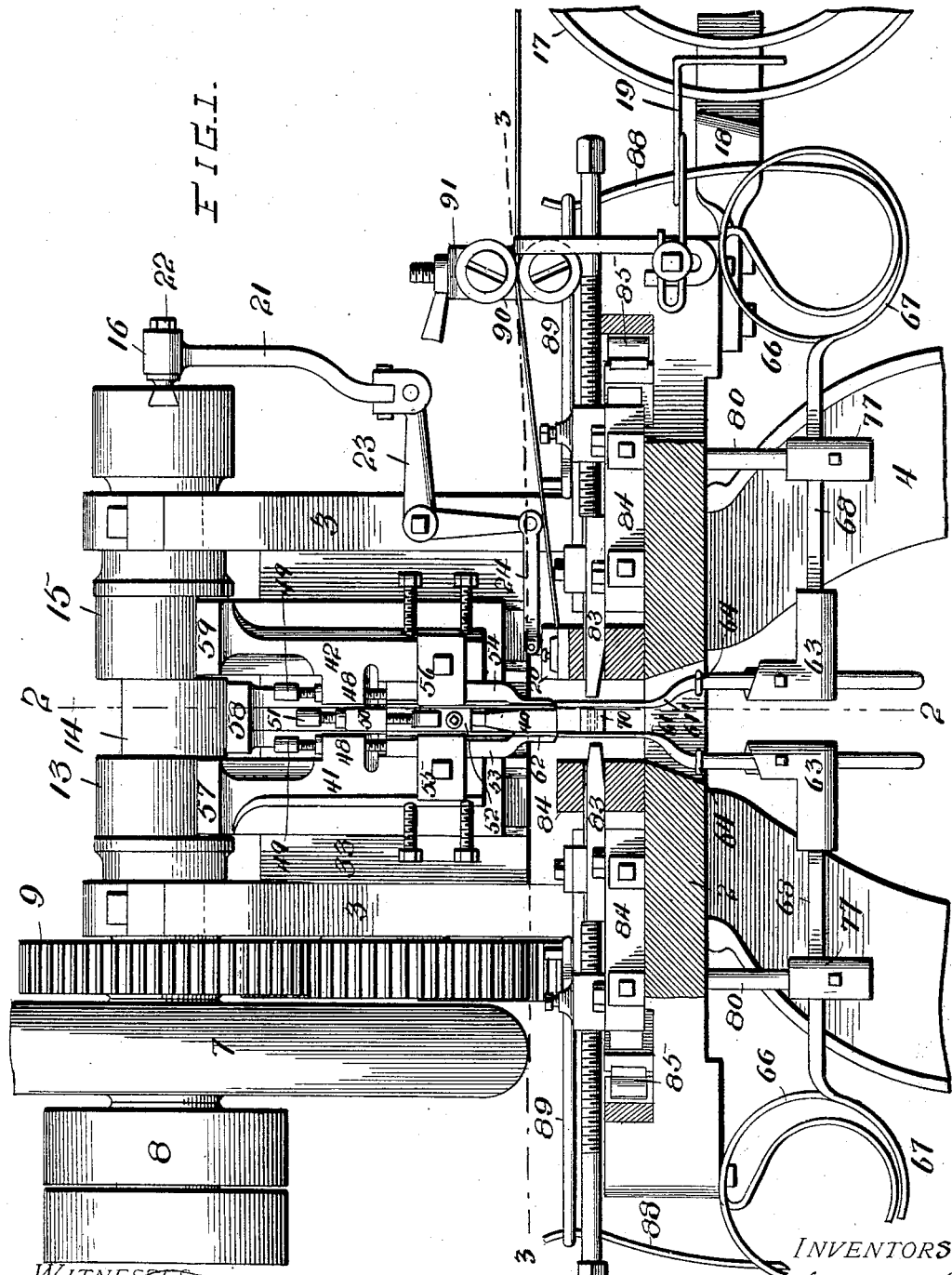

No. 829,918. PATENTED AUG. 28, 1906.
J. N. GIFFORD & C. H. MORTON, JR.
WIRE TACK MACHINE.
APPLICATION FILED JULY 15, 1905.

10 SHEETS—SHEET 1.

WITNESSES:

INVENTORS
Charles H. Morton, Jr.
and James N. Gifford.
BY Marcellus Bailey
Attorney No. 829,918. PATENTED AUG. 28, 1906.
J. N. GIFFORD & C. H. MORTON, Jr.
WIRE TACK MACHINE.
APPLICATION FILED JULY 15, 1905.

10 SHEETS—SHEET 2.

WITNESSES:

INVENTORS
Charles H. Morton Jr
and James N. Gifford
By
Attorney

No. 829,918. PATENTED AUG. 28, 1906.
J. N. GIFFORD & C. H. MORTON, Jr.
WIRE TACK MACHINE.
APPLICATION FILED JULY 15, 1905.

10 SHEETS—SHEET 4.

No. 829,918. PATENTED AUG. 28, 1906.
J. N. GIFFORD & C. H. MORTON, Jr.
WIRE TACK MACHINE.
APPLICATION FILED JULY 15, 1905.

10 SHEETS—SHEET 5.

WITNESSES: INVENTORS
Charles H. Morton Jr.
and James N. Gifford
By
Attorney

No. 829,918. PATENTED AUG. 28, 1906.
J. N. GIFFORD & C. H. MORTON, Jr.
WIRE TACK MACHINE.
APPLICATION FILED JULY 15, 1905.

10 SHEETS—SHEET 6.

No. 829,918. PATENTED AUG. 28, 1906.
J. N. GIFFORD & C. H. MORTON, Jr.
WIRE TACK MACHINE.
APPLICATION FILED JULY 15, 1905.

10 SHEETS—SHEET 7.

WITNESSES

INVENTORS

BY

Attorney

THE NORRIS PETERS CO., WASHINGTON, D. C.

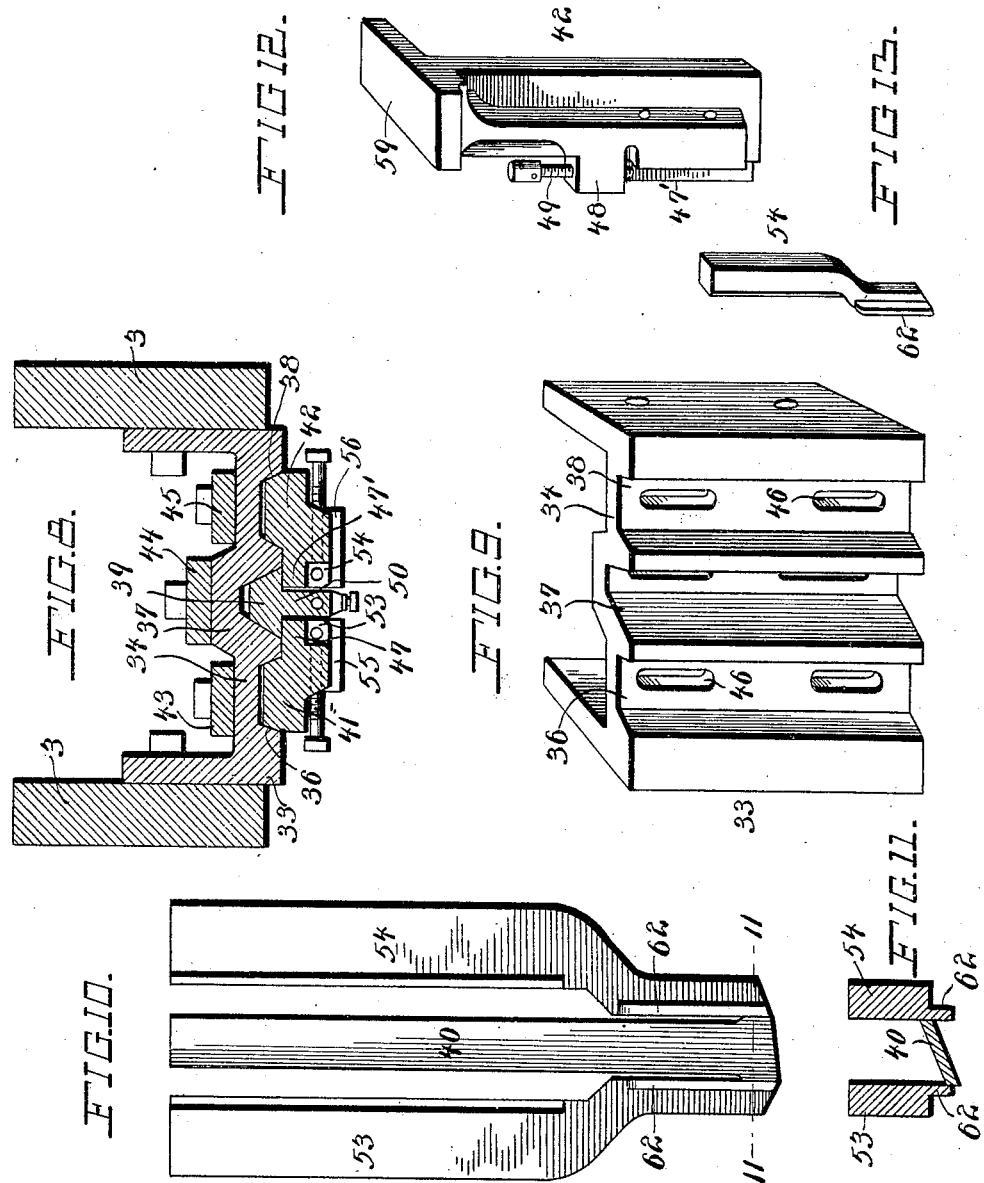

No. 829,918. PATENTED AUG. 28, 1906.
J. N. GIFFORD & C. H. MORTON, Jr.
WIRE TACK MACHINE.
APPLICATION FILED JULY 15, 1905.
10 SHEETS—SHEET 9.
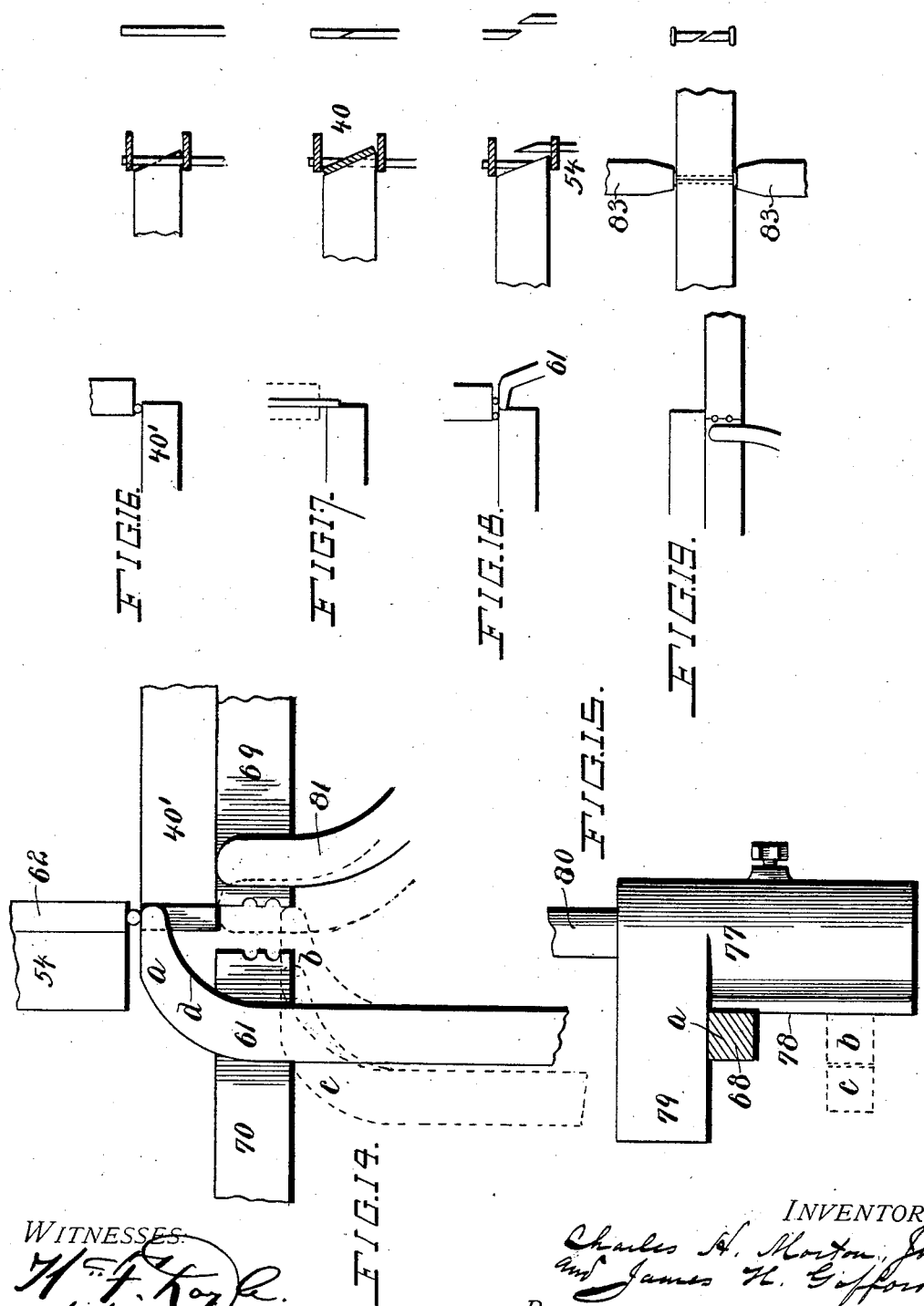

No. 829,918. PATENTED AUG. 28, 1906.
J. N. GIFFORD & C. H. MORTON, Jr.
WIRE TACK MACHINE.
APPLICATION FILED JULY 15, 1905.
10 SHEETS—SHEET 10.
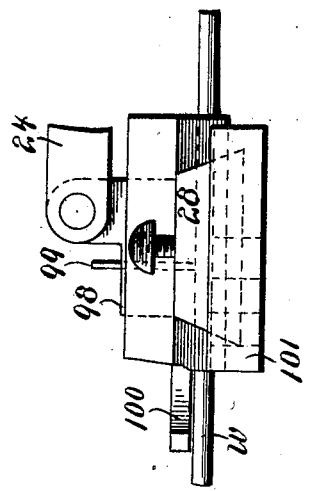
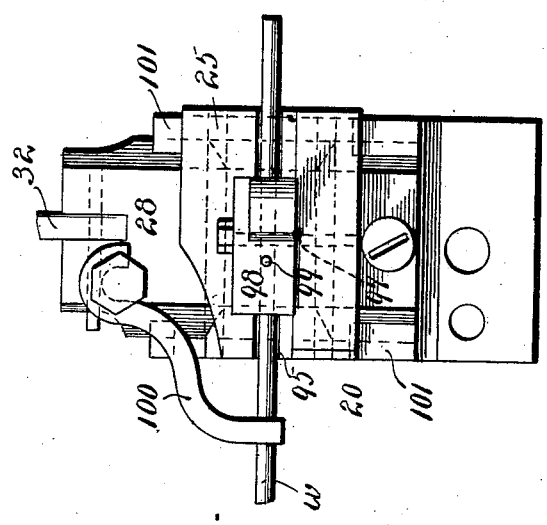
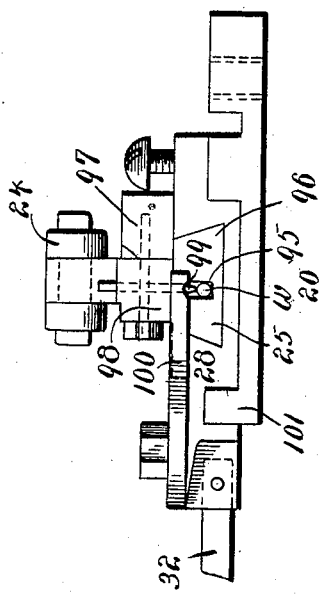
WITNESSES:
INVENTORS
Charles H. Morton Jr.
and James N. Gifford
By
Attorney

UNITED STATES PATENT OFFICE.

JAMES N. GIFFORD AND CHARLES H. MORTON, JR., OF FAIRHAVEN, MASSACHUSETTS, ASSIGNORS, BY MESNE ASSIGNMENTS, TO GIFFORD AND MORTON CORPORATION, OF NEW BEDFORD, MASSACHUSETTS, A CORPORATION OF MASSACHUSETTS.

WIRE-TACK MACHINE.

No. 829,918.  Specification of Letters Patent.  Patented Aug. 28, 1906.

Application filed July 15, 1906. Serial No. 269,816.

*To all whom it may concern:*

Be it known that we, JAMES N. GIFFORD and CHARLES H. MORTON, Jr., of Fairhaven, county of Bristol, and State of Massachusetts, have invented a new and useful Improvement in Wire-Tack Machines, of which the following is a specification.

This invention relates to machines adapted to make wire nails and tacks. The embodiment thereof illustrated in the drawings is adapted to make wire tacks; but we wish it to be understood that our invention in its principles of operation and in the general features of construction is equally adapted to the making of wire nails of different sizes.

It has for its object to produce a machine of this character possessing great speed and economy of operation, that is accurate in its movements, and produces a very superior product.

Figure 2:
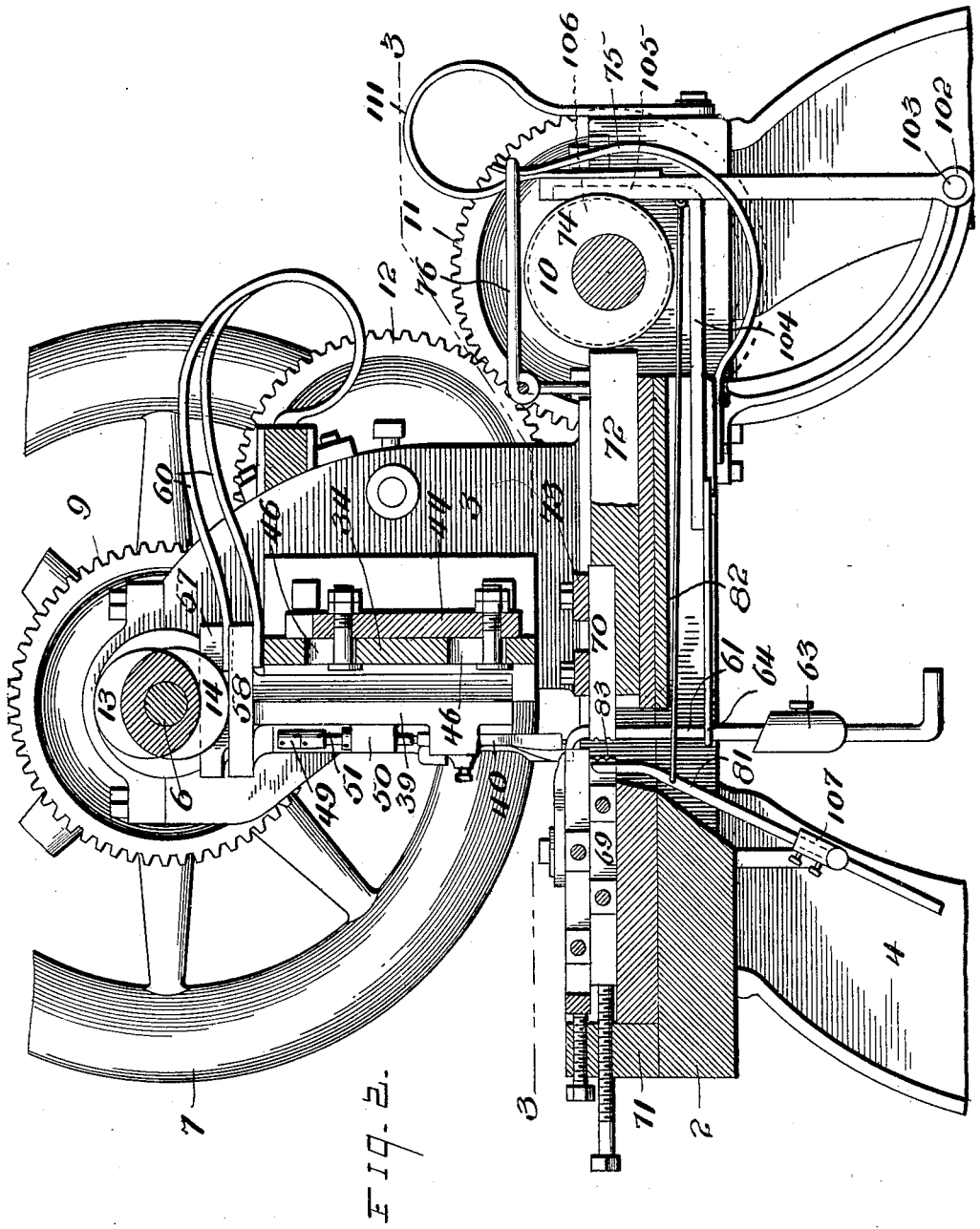
Figure 3:
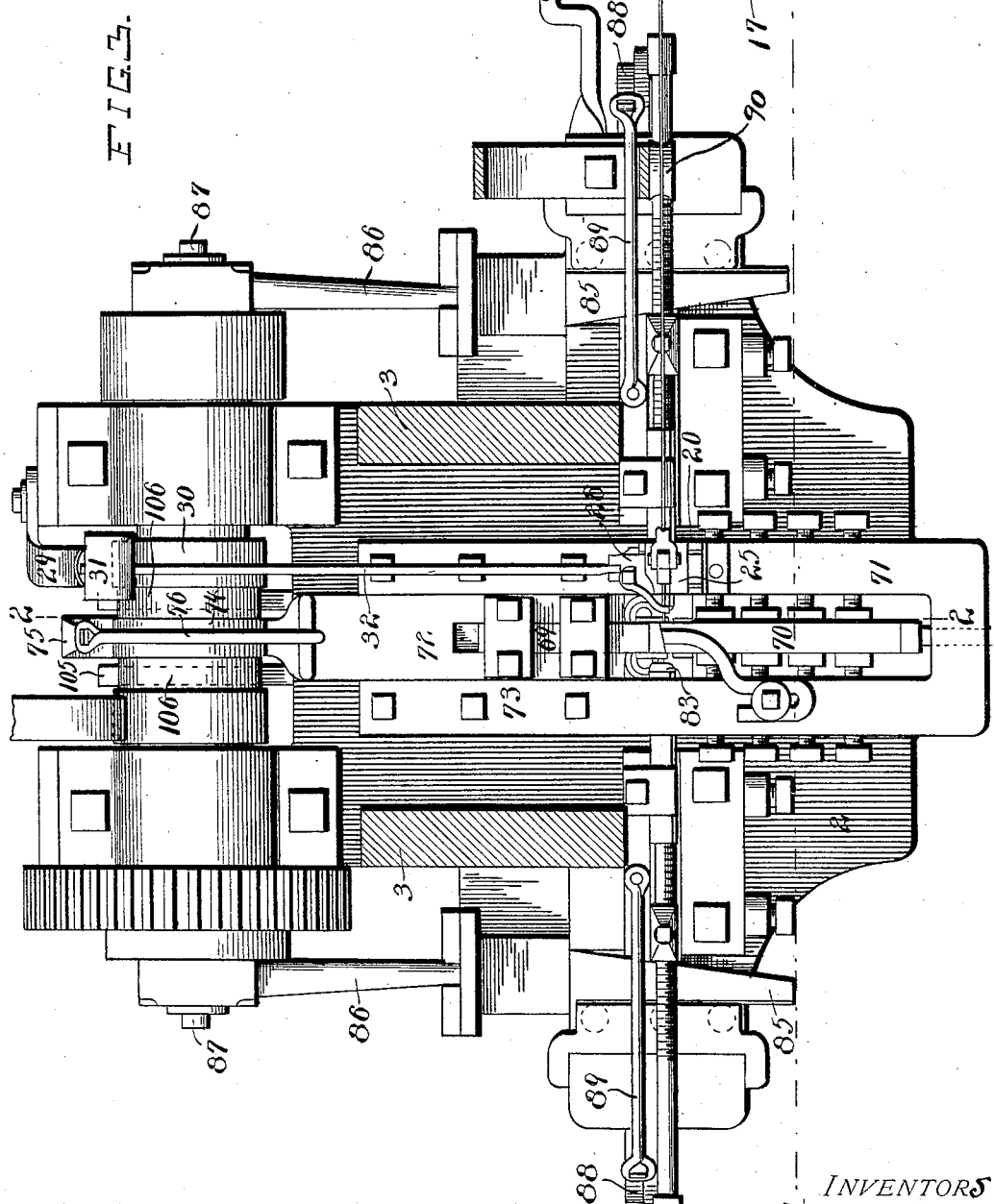
Figure 4:
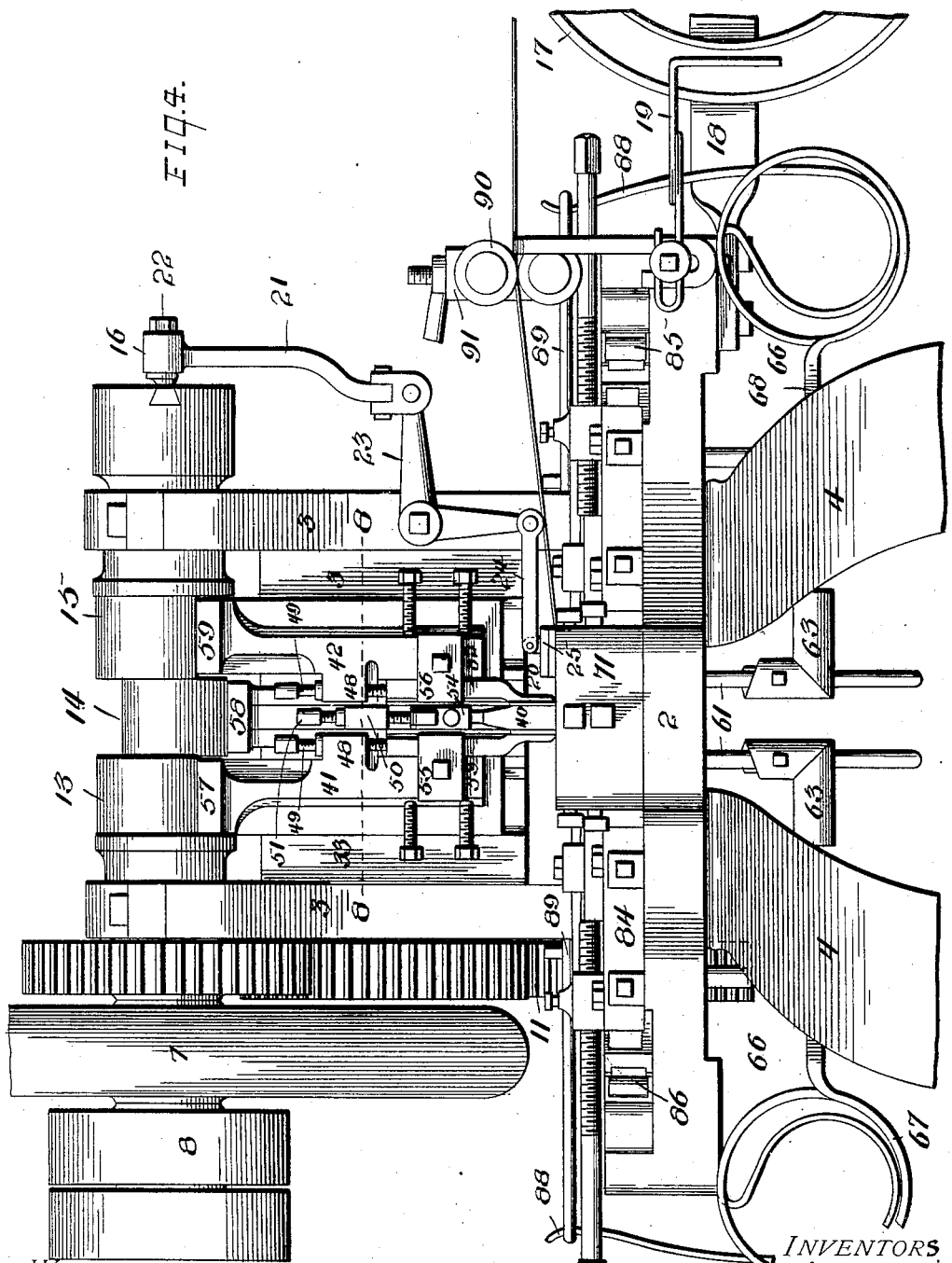
Figure 5:
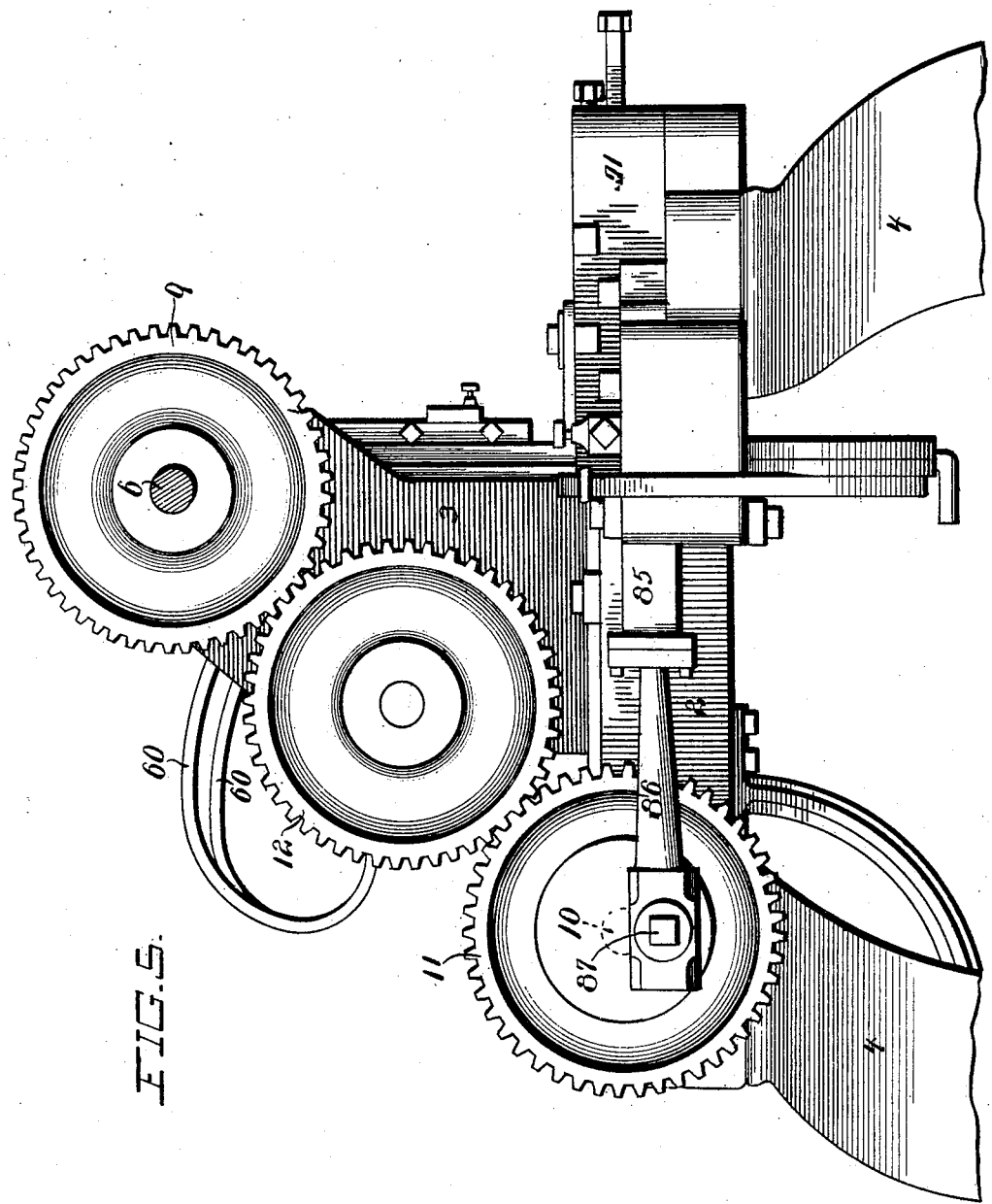
Figure 6:
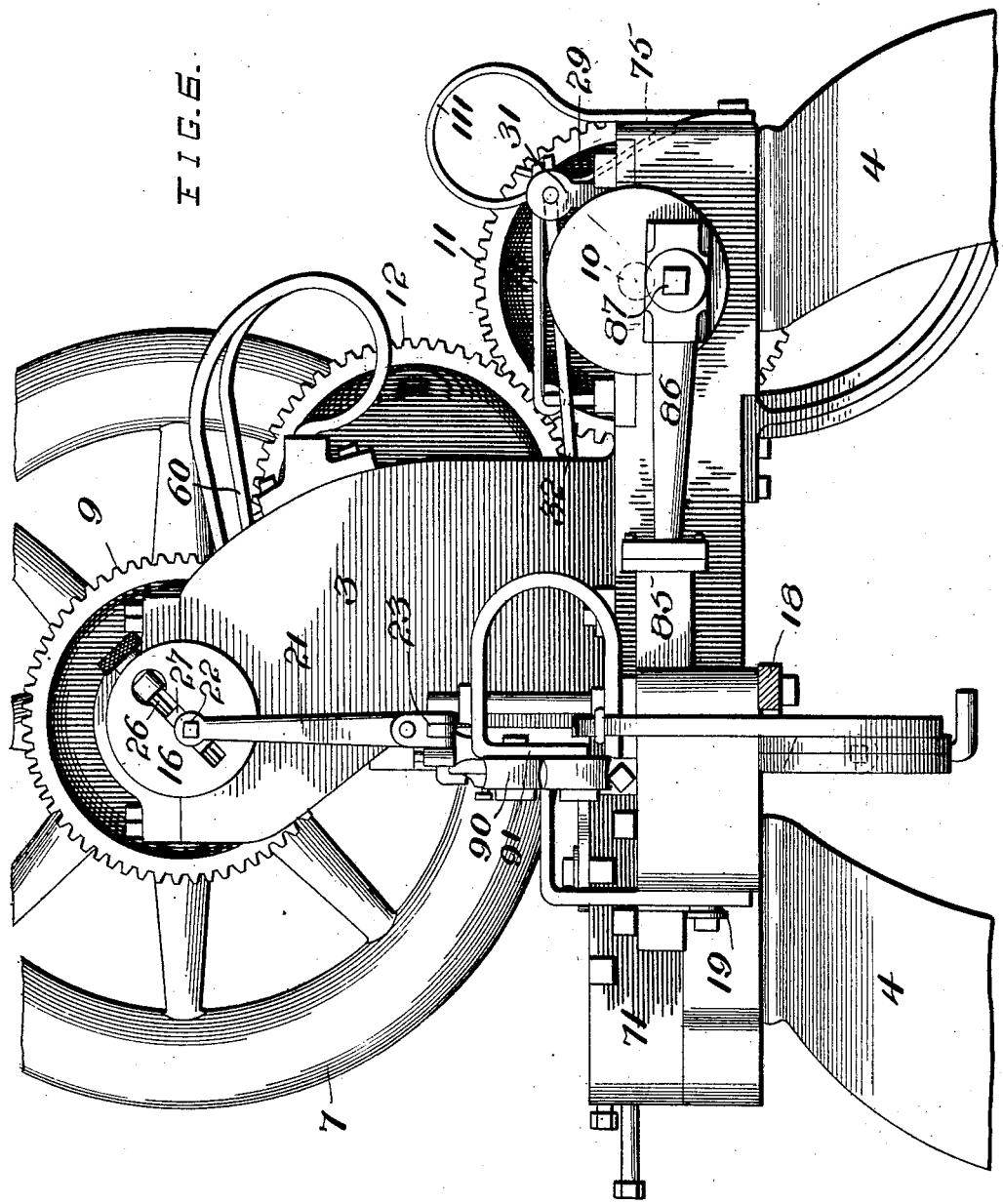
Figure 7:
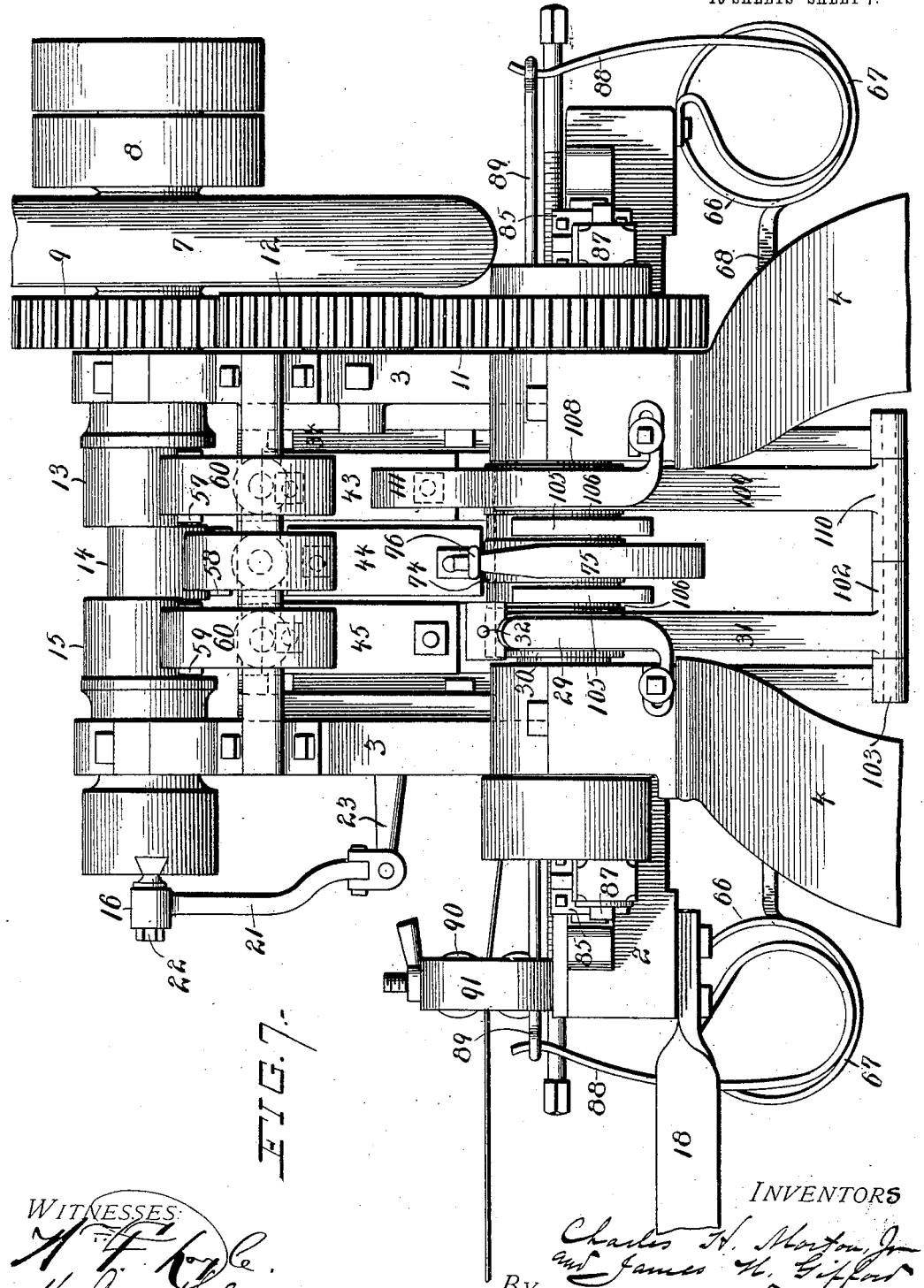

In the accompanying drawings, Figure 1 is a vertical transverse section of a machine embodying our improvements, taken on the line 1 1 of Fig. 3. Fig. 2 is a vertical longitudinal section taken on the line 2 2 of Figs. 1 and 3. Fig. 3 is a horizontal section taken on the line 3 3, Figs. 1 and 2. Fig. 4 is a front elevation. Fig. 5 is an elevation of the left-hand side of the machine. Fig. 6 is an elevation of the right-hand side. Fig. 7 is a rear elevation. Fig. 8 is a horizontal section taken on the line 8 8 of Fig. 4. Fig. 9 is a detached perspective view of the frame that supports and guides the vertically-moving tools. Fig. 10 is a front elevation, enlarged, of the said tools. Fig. 11 is a horizontal section taken on the line 11 11 of Fig. 10. Fig. 12 is a perspective view of a carrier for one of the wire-cutters. Fig. 13 is a perspective view of a cutter. Fig. 14 is a side elevation, enlarged, of parts of one of the cutters and its opposing bearer, the holding-dies, and one clearer, the movements of some of these parts being indicated by dotted lines. Fig. 15 is a detail view, enlarged, of the stop that controls the movements of the supporting and operating spring of a bearer. Figs. 16, 17, 18, and 19 are a series of diagrammatic views illustrating various steps or stages in the making of a pair of tacks, the parts of the machine operating upon the wire blanks being represented in each view in both elevation and in plan and the various operations upon the wire being indicated. Figs. 20, 21, and 22 are views illustrating the feeder that advances the wire to the cutting-tools, Fig. 20 being a front view, Fig. 21 a side view, and Fig. 22 a top plan view.

In order to assist in an understanding of the machine we are about to describe and in following the movements performed by the several parts of the machine, we will briefly state what the machine is intended to accomplish. The wire-stock is intermittently fed to a set of cutters that sever therefrom two blanks, from which are formed two tacks at each cycle of movements of the machine. Two knives are employed for effecting the separation of the blanks from the main wire, one of the knives cutting the wire obliquely to form the points of the tacks, while the other cuts square across or transversely. After the blanks have been severed they are carried to a pair of dies by which they are held while the heading-dies upset the exposed ends of the blanks and form the heads of the tacks, after which the tacks in a finished condition are discharged from the machine.

The various moving parts of the machine are mounted in a frame that comprises a bedplate 2, uprights 3 3, and a suitable leg-frame 4. In bearings at the upper ends of the uprights is mounted the main shaft or spindle 6, upon which are supported the fly-wheel 7 and the belt-pulleys 8. A gear, preferably a spur-wheel, 9 is mounted on the spindle 6 and operates to drive a second and lower spindle or shaft 10, the gearing between the two comprising a spur-wheel 11 on the shaft 10 and the idle spur-pinion 12, mounted on a stud projecting from one of the uprights of the frame and interposed between the gears 9 and 11. On the main shaft or spindle 6 are also mounted or formed three cams 13, 14, and 15 and a crank connection 16, the functions of which parts will be hereinafter set forth.

17 designates the reel on which the wire from which the tacks are made is wound. It is mounted in a bracket 18, extending from one side of the frame, and a friction-spring 19 bears against the rim of the reel and prevents it from overrunning.

The wire is fed intermittently to the knives or cutters by means of a clutch-feeder, which is preferably of the construction illustrated in the drawings (see particularly Figs. 20, 21, and 22) and indicated as a whole by 20. This feeder is operated from the crank 16. A link 21 connects the wrist-pin 22 of the crank with one arm of the bell-crank lever 23, the other arm of which is connected by a link 24 with the longitudinally - reciprocating portion 25 of the feeder. In order to provide for adjusting the throw or movement of the feeder, we make the wrist-pin 22 of the crank adjustable toward and from the axis of the shaft 6, with which it is connected. To provide for this adjustment, we mount in a suitable slot formed in the disk of the crank connection 16 an adjusting-screw 26, on which is mounted a nut 27, which carries the wrist-pin, Fig. 6.

The longitudinally-movable member 25 of the wire-feeder is provided with a groove or channel 95, in which the wire $w$ lies, and is itself seated in ways 96, formed in a transversely-movable member 28. To the reciprocating member 25 there is pivoted at 97 a gripping member 98, that carries a tooth or pointed pin 99, arranged to so engage with the wire as to insure its being fed forward whenever the feeder is moved toward the cutting-tools. The gripping member 98 has a limited movement upon its pivot, so that whenever the feeder is drawn backward the tooth 99 is slightly raised and moves freely over the wire. The link 24 is preferably connected directly to the part 98, so that it not only effects the longitudinal reciprocation of the feeder, but also the proper operation of the gripper thereof.

100 designates a guide for the wire that is preferably secured to the member 28 of the feeder. This transversely-movable member of the feeder is mounted in ways or guides 101, that direct its movements along lines at right angles to the lines of movement of the part 25. As has been stated, the part 25 is carried by the part 28, so that whenever the latter is moved it carries the former with it, for a purpose that will be later described. A link 32, connected with the transversely-movable member 28, imparts movements thereto and connects it with the arm 31 of a rocker 102, that is mounted upon a shaft 103 at the rear of the machine, and a spring 29, bearing upon this arm, tends to move the feeder toward the front of the machine, which is its normal position. The rearward movement of the feeder is given by a cam 30 on the shaft or spindle 10 and arranged to bear against the arm 31 of the rocker.

The knives for severing the wire and the parts that hold the wire while the cutters are operating thereupon are mounted at the front of the machine in line with the feeder 20. These parts are mounted in carriers supported in a stationary frame 33, that is arranged between and secured to the uprights 3 of the main framework of the machine. (See Figs. 8 and 9.) This frame comprises a cross-plate 34, extending between the uprights and having in its front face a series of vertically-disposed grooves or recesses 36, 37, and 38.

In the groove to the left as viewed from the front (designated 36) is mounted the carrier 41 for the holder or clamping member 53, that engages with the free end of the wire—that is, the end that is farthest from the reel. In the middle groove 37 is mounted the carrier 39 for the cutter 40, which operates to sever the wire in such manner as to produce the pointed ends of the tacks, while in the other groove 38, the one to the right, is mounted the carrier 42 for the tool 54, that operates as a knife to sever the wire blanks from the main portion of the wire. The side walls of these several grooves are preferably flaring and form guideways for the sliding carriers, which are held in place, preferably, by means of the plates 43, 44, and 45 at the back of the cross-plate 34 and connected with the carriers by bolts that pass through slots 46 in the plate. The carriers 41 and 42 are provided with inward-extending edge portions 47 47', that overlie the edges of the central carrier 39, as indicated in Fig. 8, thus assisting in holding the latter in place. The upper portions of these laterally-extending overlying edges of the carriers are constructed to form forwardly-extending bearings 48 48 for the adjusting-screws 49, by means of which the vertical positions of the tools 53 and 54 are controlled. The central carrier 39 is likewise provided with a forward-extending bearing 50 for the screw 51, that controls the position of the cutter 40. The tools 53, 40, and 54 are secured to their several carriers by suitable clamps, (designated respectively, 55, 52, and 56.)

The tool-carriers are provided at their upper ends with bearing-heads 57, 58, and 59, that are held by springs 60, arranged in rear of the plate 34 in close engagement with the cams 13, 14, and 15 on the main shaft of the machine, and which cams are so laid out as to give to these tools their required movements.

It will be seen that the plate 34, in which the reciprocating tools are mounted, is arranged directly below the main cam-shaft 6 and that the bearing-heads of the tool-carriers overlie the plate, so that the operating-cams may be directly above and in the planes of movement of the tool-carriers. This construction also permits of the engagement of the lifting-springs 60, which are placed at the back of the machine, so as to be out of the way, directly with the bearing-heads.

As has been stated, the feeder is arranged to advance the wire at each reciprocation a distance sufficient to produce blanks from which two tacks may be formed, and it carries the forward end of the wire under the tools when they are in their elevated positions. The two tools 53 and 54 are preferably alike in construction, with the exception that the positions of their several parts are reversed—that is, one is a right-hand tool and the other a left-hand tool. Each of these tools is provided with a bill or forward-extending relatively thin edge 62. (See Figs. 10 and 11.) Below and opposite to the lower edges of the bill portions of these tools are situated the heads of the bearers 61 61', and between them is mounted the cutting-blade of the knife 40, as clearly represented in Figs. 10 and 11. The latter is arranged to sever the wire obliquely or with a diagonal cut, so as to produce with one cut the pointed ends of the two tacks that are made at each cycle of movements of the machine.

The cams 14 and 15, that operate the cutting-tools, are so timed that the middle knife, which produces the diagonal cut, operates first and then rises, after which the right-hand knife 54 severs the wire blank from the main piece of wire. The cutting edge of the latter knife 54 is in rear of the cutting edge of the knife 40, and the wire is moved into position under the knife 54 by the inward transverse movement of the feeder, produced by the cam 30 on the counter-shaft acting on the rocker-arm 31 and through it and the member 28 of the feeder moving the latter. It will thus be seen that at each cycle of movements of the machine two wire blanks are formed, each pointed by the diagonal cut of the knife 40, and each blank held between one of the tools and the opposing bearer, by which holding parts they are delivered to the dies, where the heading operations take place.

The bearers 61 61' are adjustably supported in holders 63, that are connected with and preferably carried by springs 66, that give to the bearers certain of their movements and hold them in proper working relations to the tools 53 and 54. These springs are preferably arranged at the front corners of the frame and have the coiled portions 67 and the relatively long straight portions 68, at the ends of which latter are the holders or carriers 63 for the bearers. Each bearer passes through an eye or loop 64 at the end of a link that connects it with a rod 104, extending rearward into proximity to the cam-shaft 10, where its end is upturned to form a contact-arm 105, that bears against a cam 106 on this shaft. There are two of these cams, one for each bearer, and they are preferably arranged on opposite sides of the cam 74, (to be presently described,) that operates the movable die for holding the tack-blanks while being headed. The cams 106 impart to the bearers certain of their operative movements and the springs 66 their other movements, as will be later described.

It is very important to secure rapid and accurate working of the machine that the opposing faces of the tools 53 and 54 and the bearers between which the wire blanks are held and by which they are moved from the position where the cutting-off operations take place to the dies where the heading operations take place, shall remain in parallelism and in practically unchanged relations to each other at all times while carrying the blank, and this we are enabled to secure by mounting the bearers in the manner described. It is well understood by those familiar with this art that if there are any relative movements of these two parts, the tool and the bearer, the short wire blanks will be turned and consequently somewhat displaced, with the result that rapid and accurate work cannot be secured. The construction of the spring 66 is such that the arm 68 thereof operates both to raise the bearer and to move it toward the front of the machine and laterally relative to the opposing blank-holding member, so that the position of the bearer when in its normal place of rest ready to receive a blank is under the action of the spring 66 and the stop 77 directly below the bill 62 of the tool with which it coöperates. In order to bring the bearer to rest in exactly the proper position, we employ a stop 77, adjustably mounted upon a rod 80 and formed with a vertical face 78 and an overhanging arm 79, formed with a plain under face at right angles to the face 78.

69 represents the stationary, and 70 the movable, die, between which the two wire blanks are held during the heading operations. The former is mounted in the die-frame 71 and the latter in a carrier 72, arranged to slide between the ways 73. Each of the dies has formed in its face two grooves that are adapted to receive the blanks. The left-hand blank, held between the bill of the tool 53 and the bearer 61, is delivered to the upper grooves of the dies, and the blank held between the tool 54 and its bearer is delivered to the other set of grooves, the movements imparted by the cams 13 and 15 being of such extent and so timed that the blanks will be opposite their respective grooves when the holding-dies come together. The forward movement of the die 70 for closing upon the blanks is imparted to the carrier 72 by a cam 74 on the lower shaft 10, and its backward or opening movement is imparted by the spring 75, arranged at the back of the machine and connected with the carrier by a link 76.

83 83 represent the heading-dies arranged upon the opposite sides of the holding-dies and mounted in suitable guideways 84. They are moved inward to engage with and upset the ends of the wire blanks, and thereby form the heads of the tacks, by wedges 85, that are connected by the pitman 86 with cranks 87 at the opposite ends of the lower driving-shaft 10. The heading-dies are moved outward after the wedges have been retracted by springs 88, arranged at the sides of the machine and connected with the dies by links 89.

It will be observed that the independent grooves in the dies are disposed in the vertical transverse planes occupied by the blanks when severed, so that they may be delivered directly to such grooves by the holders and carriers for the blanks without requiring any movements of the latter in the direction of the length of the blanks. By employing independent grooves for each blank the tendency for the pointed ends of two blanks to become stuck together during the heading operation is avoided.

After the tacks have been headed they sometimes stick in the grooves in the holding-dies, and it is therefore necessary to provide means for removing them should they fail to drop when the dies are separated. The bearers 61 61' serve to clear the tacks from the grooves in moving die 70. As the latter moves backward the heads of any of the tacks that may remain in the grooves thereof come into engagement with the edges of the bearers and are thereby stripped or cleared from the die. Clearers 81 perform a similar function for the stationary die, removing any headed tacks that may stick therein. These clearers are mounted adjustably in pivoted holders 107. They are moved rearward to clear the die 69 by a cam 108 on the shaft 10, which cam bears against the arm 109 of a rocker 110, mounted on the shaft 103. A spring 111 bears against the arm 109 and holds it in engagement with the cam and also operates to restore the clearers 81 to their normal positions, as indicated in Fig. 2.

The several cams upon the shaft 10 have been referred to and described. We will now state their relative location. Referring to Fig. 7 and beginning at the left, the first cam is that designated 30, arranged to give the inward or rearward transverse movement to the wire-feeder, the spring 29 operating to cause the opposite movement. The next cam 106 operates one of the bearers, the third cam 74, located at the center of the shaft, operates the movable die for holding the blanks during the heading operations, the next cam 106 controls the other bearer, and the last cam of the series 108 operates the clearers. Besides these cams the shaft 10 carries at its ends the cranks that move the wedges by which the heading-dies are forced inward into engagement with the tack-blanks.

Intermediate the feeder 20 and the reel upon which is placed the coil of wire are arranged a pair of straightening-rolls 90, between which the wire passes. These rolls are mounted in a frame 91 and are forced toward each other with any desired degree of pressure by any well-known means.

We will now describe the operation of the machine. The following cycle of operations takes place at each revolution of the main shaft or spindle of the machine 6: The feeder grips the wire and advances the free end thereof beneath the cutters, where it is gripped and securely held by the bearers and the tools that are opposed thereto, Fig. 16. While thus held, the knife 40 is depressed, passing the edge of the stationary knife 40' and severing the wire with a diagonal or oblique cut intermediate the two bearers and producing the pointed ends of the tacks, Fig. 17. Immediately after performing this cut the knife is raised, the feeder carries the wire backward beneath the knife portion of the tool 54, (the cut-off and pointed blank to the left being still retained between the bearer and the bill of the tool 53,) and the latter descending cuts off the second blank, Fig. 18. The two blanks now held between the tools 53 and 54 and the opposing bearers are carried downward by the descent of the tools, through the action of the cams 13 and 15, until the blanks come opposite the grooves or scores in the holding-dies 69 and 70. The latter immediately close upon the blanks, the heading-dies are advanced, and engaging with the projecting ends of the blanks upset them and form the heads of the tacks, Fig. 19, and this being done they retire the holding-dies open, and the clearers strip the finished tacks from the holding-dies, whence they drop into a suitable receptacle or transfer apparatus.

It has been before stated that the opposite blank-engaging faces of the bearer and the opposing tool remain in parallelism at all times. This is illustrated in Fig. 14, where the several movements and positions of the bearer are indicated. At $a$ the position of the bearer as it holds the blank during the cutting operation is shown in full lines. As the tool is forced downward by its operating-cam to deliver the blank to the holding-die the bearer is carried before it, the spring 66 yielding to permit this, but not operating to turn or twist the bearer, which is steadied and directed in its movement by the guide 64. The position the bearer occupies when the blank is delivered to the holding-dies is indicated by the dotted lines $b$. As soon as the holding-dies take the blanks the bearer is moved backward to the position indicated in dotted lines c, and the tool is raised, the bearer following the tool to its normal position of rest that these parts may be out of the way of the heading-dies. After the heading of the tacks has been completed and the heading-dies withdrawn the holding-dies 69 70 are separated, and as the movable one 70 is moved backward the bearers 61 operate to clear from the seats in the die 70 any tacks which may remain stuck in the grooves thereof. This occurs by reason of the fact that the bearers lie close to the side faces of the movable die 70 and are held stationary when the die is moved back, so that the heads of the tacks, which will project out beyond the side faces of the die as they lie in the grooves therein, will come into engagement with the bearer and be removed thereby.

Having described our invention, what we claim, and desire to secure by Letters Patent, is—

1. In a wire-tack machine, the combination of means for intermittently feeding the wire to form two blanks at each feeding operation, means for holding the opposite ends of the piece of wire from which the blanks are formed, means for cutting the piece of wire in two on an oblique line between the held portions to form the pointed ends of two tacks and to sever one blank from the wire-stock, and other, independently-operated, means for severing the other blank from the wire-stock, substantially as set forth.

2. In a wire-tack machine, the combination of means for intermittently feeding the wire to form two blanks at each operation, means for holding the opposite ends of the piece of wire so fed comprising reciprocating tools provided with forwardly-extending bills or ribs, means for holding the wire against the ends of the said bills, and means arranged between the said bills for cutting the said piece of wire in two to form the pointed ends of two tacks, substantially as set forth.

3. In a wire-tack machine, the combination of means for intermittently feeding the wire to form two blanks, means for holding the free end of the wire during the cutting operations, means for cutting the fed piece of wire in two on an oblique line to form the pointed ends of two tacks, and a knife for severing the attached portions of the said piece of wire from the wire-stock, provided with a forwardly-extending bill or projecting rib arranged to engage with the wire piece immediately adjacent to where the cut that severs it from the stock is made and hold that end thereof while the cut that forms the pointed ends is being made substantially as set forth.

4. In a wire-tack machine, the combination of means for intermittently feeding the wire to form two blanks, means for holding the opposite ends of the piece of wire from which the blanks are formed, means for forming the pointed ends of two tacks between the held portions of the wire thereby severing one blank, means for cutting off the portion of the blank which is united with the wire-stock, and independent means for delivering the two blanks to dies for finishing them into tacks, substantially as set forth.

5. In a wire-tack machine, the combination of means for intermittently feeding the wire to form two blanks at each operation, means for holding the wire during the cutting operations, a cutter for producing the pointed ends of two tacks thereby separating one blank from the stock, another cutter for severing the other blank from the wire-stock, independent means for delivering the blanks to dies for finishing them into tacks, a single power-shaft and means driven thereby for independently operating the said cutters, and the means for delivering the blanks to the dies, substantially as set forth.

6. In a wire-tack machine, the combination of means for feeding the wire to form two blanks, a cutter for cutting the wire in two and for pointing the adjacent ends of the two blanks, a cutter for severing the attached blank from the stock arranged at the side of the first-named cutter, and a holder for the free end of the wire constituting the blanks arranged at the opposite side of the first-named cutter and in a relation thereto similar to that of the second-mentioned cutter, and means for operating the cutters and the said holder, substantially as set forth.

7. In a wire-tack machine, the combination of the supporting-frame, a stationary vertically-disposed slotted plate mounted therein and having a grooved face, carriers mounted in the grooves in the said plate, holding-plates arranged on that side of the plate which is opposite its grooved face, and connected with the carriers by bolts passing through the slots in the plate, cutters mounted in the carriers, and means for independently operating the carriers, substantially as set forth.

8. In a wire-tack machine, the combination of a supporting-frame, a stationary plate mounted therein, having one face provided with an intermediate groove and a groove on either side thereof, a carrier mounted in the central groove, carriers mounted in the grooves to the side thereof and arranged to overlie the carrier in the center groove, thereby holding it in place, tools mounted in the said carriers and means for reciprocating the carriers in their grooves, substantially as set forth.

9. In a wire-tack machine, the means for holding the wire blank, comprising a positively-driven member having a gripping-face, another holding member having a gripping-face parallel with the face of the first-named member, a spring for holding the last-named gripping member toward the first one but leaving it free to partake of the movements positively imparted to the latter, and a stop for engaging with and positively arresting the spring to cause the spring-held gripping member to normally rest in position to receive a blank and with its face parallel with the face of the other gripping member, substantially as set forth.

10. In a wire-tack machine, the means for holding the wire blank, comprising a positively-driven member having a gripping-face, another, spring-actuated, holding member, a holder in which the spring-actuated holding member is supported, means for adjusting such holding member in its holder, a spring for moving the last-named holding member and its holder toward the positively-driven one but leaving it free to partake of the movements positively imparted to the latter, and a stop for arresting and holding in normal position the spring-held member, substantially as set forth.

11. In a wire-tack machine, the means for holding the wire blank, comprising a positively-driven member having a gripping-face, another holding member having a gripping-face parallel with the face of the first-named member, a spring for holding the last-named gripping member toward the first one but leaving it free to partake of the movements positively imparted to the latter, a stop for positively arresting and holding in normal position the spring-actuated holding member, and means for adjusting such stop to vary the normal position of the said spring-actuated member, substantially as set forth.

12. In a wire-tack machine, the combination of a positively-actuated member for engaging with and holding the blank, a bearer opposed thereto for engaging with the blank, a spring connected with the bearer and arranged to hold the same toward the face of the positively-driven holding member and also tending to move the bearer laterally relative to the said member, and means for maintaining the wire-engaging faces of the positively-actuated holding member and the spring-actuated bearer in parallelism, and in practically unchanged relations to each other while holding a blank, substantially as set forth.

13. In a wire-tack machine, the combination of a positively-driven gripping or holding member for engaging with the wire blank, a bearer opposed thereto for also gripping the wire blank, a spring that tends to hold the bearer toward the other holding or gripping member and also tends to move it laterally relative thereto, and a stop for determining the normal position of rest of the spring-actuated bearer, substantially as set forth.

14. In a wire-tack machine, the combination of a positively-driven holding and gripping member for engaging with the wire blank, a bearer opposed thereto, the spring 66 connected with the bearer, the spring being formed with the coil 67 and the arm 68, to the end of which is connected the bearer, and means for directing the movements of the bearer, substantially as set forth.

15. In a wire-tack machine, the combination of the means for feeding the wire intermittently to form two blanks at each operation, the cutters for pointing the blanks and severing them from the wire-stock, holding dies each formed with independent seats for each blank arranged one above the other and both in the transverse vertical planes occupied by the severed blanks, means for feeding the blanks to the holding-dies with their unpointed ends projecting beyond the opposite sides of the dies, and heading-dies arranged to act simultaneously on the projecting ends of the blanks while in the holding-dies, substantially as set forth.

16. In a wire-tack machine, arranged to form two tacks at each cycle of movements, the combination with the two independent cutters one for pointing two tack-blanks and the other for separating them from the wire-stock, such cutters being out of line with each other, of a feeder for advancing the wire to one of the cutters, means for moving the feeder longitudinally to advance the wire a distance sufficient to form two blanks, and means for moving the feeder laterally to present the wire to the other cutter, substantially as set forth.

17. In a wire-tack machine, arranged to form two tacks at each cycle of its movements, the combination of a cutter for pointing the two blanks and severing one of them, another cutter for severing the other blank, such cutters being out of line with each other, a feeder for advancing the wire longitudinally a distance equal to the length of the two blanks, and means for moving the feeder laterally after the pointing-cutter has operated to present the wire to the cutter that severs the last-mentioned blank from the wire-stock, substantially as set forth.

18. In a wire-tack machine, the combination of means for feeding and cutting off the wire, means for pointing and heading the same, dies for holding the wire blanks while the heading operations take place, means for opening and closing the said dies, and bearers arranged to hold the blanks as they are being delivered to the said dies, the bearers being arranged close to the sides of the movable die and being arranged to remove the tacks that may stick in one of the die members after the heading operations take place, as the dies are separated, substantially as set forth.

19. In a wire-tack machine, the combination of means for feeding and cutting off the wire, means for pointing and heading the same, dies for holding the wire blanks while the heading operations take place, means for opening and closing the said dies, bearers disposed close to the sides of the dies and arranged to hold the blanks as they are being delivered to the said dies, and means for holding the bearers stationary as the dies are opened, after the heading of the tacks, to cause them to remove the tacks that may stick in one of the die members, substantially as set forth.

In testimony whereof we affix our signatures in presence of two witnesses.

JAMES N. GIFFORD.
CHARLES H. MORTON, JR.

Witnesses:
 JOB C. TRIPP,
 WILLIAM H. TABER.